United States Patent [19]

Tarpill

[11] Patent Number: 5,713,132
[45] Date of Patent: Feb. 3, 1998

[54] COAXIAL CABLE TRIMMER

[75] Inventor: Andrew J. Tarpill, East Haddam, Conn.

[73] Assignee: Capewell Components Company, Cromwell, Conn.

[21] Appl. No.: 683,364

[22] Filed: Jul. 18, 1996

[51] Int. Cl.[6] .................................................. B26B 17/00
[52] U.S. Cl. .................................................. 30/91.2; 30/90.1
[58] Field of Search ...................... 30/91.2, 90.1; 81/9.4, 9.44

[56] References Cited

U.S. PATENT DOCUMENTS

| | | | |
|---|---|---|---|
| 3,596,541 | 8/1971 | Bieganski | 30/90.1 |
| 3,703,840 | 11/1972 | Kauf | 30/90.1 |
| 4,829,671 | 5/1989 | Cheng . | |
| 4,953,293 | 9/1990 | Sterlacci | 30/90.1 |
| 4,958,433 | 9/1990 | Persson | 30/91.2 |
| 4,979,299 | 12/1990 | Bieganski | 30/91.2 |
| 5,036,734 | 8/1991 | Morrow . | |
| 5,150,522 | 9/1992 | Gwo-Jiang | 30/91.2 |
| 5,381,601 | 1/1995 | Danter et al. | 30/90.1 |

OTHER PUBLICATIONS

Advertising Literature, Jensen Tools, Inc.
Advertising Literature, Techni–Tool.
Advertising Literature, Specialized Products Company.
Advertising Literature, Ideal.
Advertising Literature, View Sonics Inc., Model VSCST–1.
Advertising Literature, Viewsonics, Inc., Model VSCST–Z.
"Universal Drop Trimmer", Ripley Company, Feb. 1996.

*Primary Examiner*—Hwei-Siu Payer
*Attorney, Agent, or Firm*—DeLio & Peterson, LLC

[57] ABSTRACT

A handheld coaxial cable trimmer tool has two sets of jaws operated simultaneously by the handles so that two different types of coaxial cables may be prepared for connection to corresponding coaxial connectors without readjusting the tool in any way. Two different snap-in blade assemblies that correspond to different types of connectors and cable are held in the two jaw sets, and third and fourth blade assemblies are held in a convenient swing-out blade storage compartment.

19 Claims, 3 Drawing Sheets

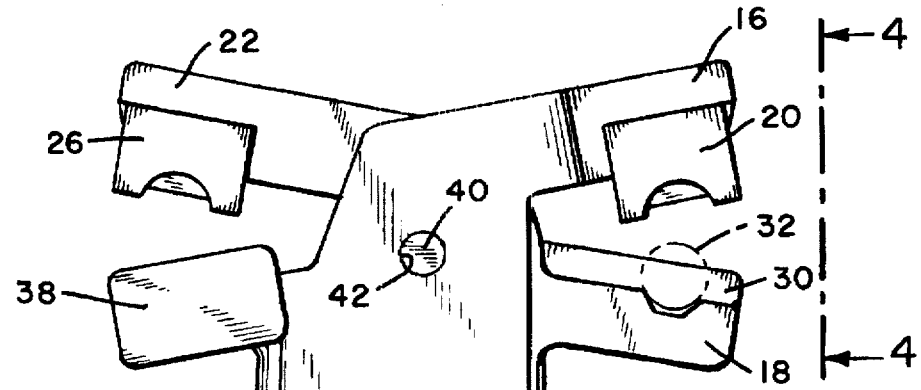
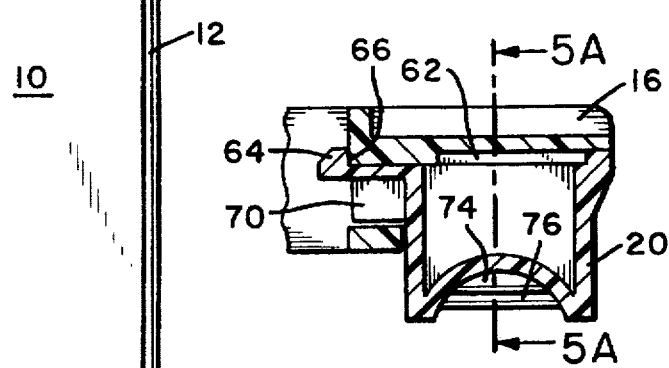
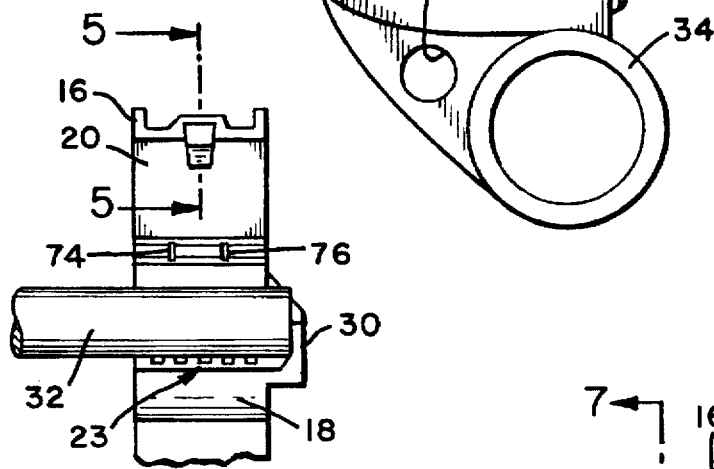
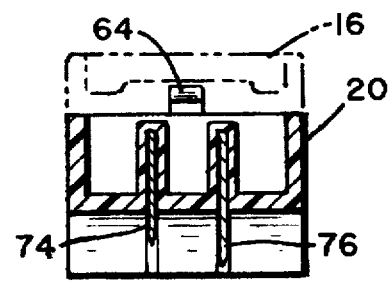
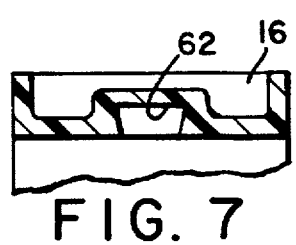
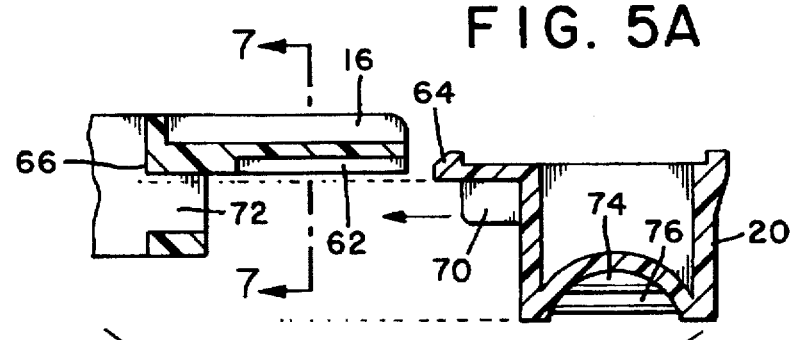
FIG. 3
FIG. 4
FIG. 5
FIG. 5A
FIG. 6
FIG. 7

5,713,132

COAXIAL CABLE TRIMMER

BACKGROUND OF THE INVENTION

1. Field of the Invention

This invention relates to tools used to remove the insulation from around the inner and outer conductors of a coaxial cable before attaching a connector. More specifically, the invention relates to coaxial cable trimmers which can strip the insulation from multiple different types of coaxial cable using interchangeable and replaceable blade assemblies.

2. Description of Related Art

Coaxial cables are widely used to distribute high frequency signals, such as video signals, to multiple reception points. Such cables include an inner conductor, such as a copper wire, surrounded by an inner layer of insulation and an outer conductor, such as a conductive wire braid or foil surrounded by an outer layer of insulation. To install a connector on the cable, it is necessary expose the two conductors for a desired length by removing the surrounding layers. This involves making two cuts. A first cut is made through the outer insulation to a depth just less than the depth of the outer conductor. A second cut is made through the outer insulation, through the outer conductor and through the inner layer of insulation to a depth just less than the depth of the inner conductor.

The two cuts must be made at different predetermined distances from the end of the coaxial cable to correspond to the type of connector to be installed. The scrap insulation which is released by the two cuts, is pulled off the end of the cable before applying the corresponding type of coaxial connector.

Coaxial cables come in a variety of different sizes having different outside diameters, different thicknesses of insulation and different conductor diameters. Also, different types of coaxial cable connectors have different requirements for the distance between the end of the cable and the two cuts described above. Consequently, the depth of the cuts and the distance of each cut from the end of the cable varies widely depending on the cable and the connector to be used.

For this reason, many conventional coaxial cable trimmers can be used only with a single type of cable and a single type of connector. Other coaxial cable trimmers have been provided with adjustable blades that can be set to make the desired cuts. More recently, coaxial cable trimmers have been provided with replaceable blade assemblies that are preset to make cuts of the required depth for a particular type of cable and connector. All of these types of trimmers are quick and easy to use when installing connectors of a desired type on a single type of cable.

However, a cable installer will often work on multiple different types of cable and may need to frequently switch back and forth between the different types. For example, in a distribution system, there may be one type of cable carrying the main signal and a different type of cable used at each drop location to carry a signal to an endpoint reception location. Alternatively, an older type of cable or connector may be in simultaneous use with a newer type of cable or connector.

Fixed and adjustable blade trimmers are totally unsuitable for making frequent changes between different types of cables. Even the replaceable blade assembly trimmer tools are inconvenient due to the time it takes to change the blade assembly each time a different set of cuts must be made. Further, the different blade assemblies are difficult to store properly, and are often misplaced. Improper storage of a blade assembly may result in damage to the blades or the user may be cut by the exposed blades when attempting to retrieve a blade assembly from a tool pouch or other inappropriate storage container. As a consequence of these difficulties, most installers carry multiple coaxial cable trimmer tools, each one being set up for a particular type of connector and cable.

Bearing in mind the problems and deficiencies of the prior art, it is therefore an object of the present invention to provide a coaxial cable trimmer that includes at least two blade assemblies held within corresponding jaw sets which are activated by a single set of handles.

Yet another object of the present invention to provide a convenient means for safely storing multiple blade assemblies in the tool.

A further object of the invention is to provide a rapid means of replacing individual blade assemblies.

A further object of the invention is to provide a low cost tool with a minimum number of components which can be snapped together during assembly.

Still other objects and advantages of the invention will in part be obvious and will in part be apparent from the specification.

SUMMARY OF THE INVENTION

The above and other objects, which will be apparent to those skilled in the art, are achieved in the present invention which is directed to a coaxial cable trimmer for making insulation removing cuts in multiple different types of coaxial cable. The trimmer includes first and second handle members pivoted together about a pivotal connection between them. The first handle member includes a first upper jaw and a second lower jaw. The second handle member includes a second upper jaw and a first lower jaw. The pivotal connection positions the first upper jaw in operative alignment with the first lower jaw to form a first jaw set and positions the second upper jaw in alignment with the second lower jaw to form a second jaw set.

First and second blade assemblies are mounted in the first and second jaw sets. Each blade assembly is designed to make insulation removing cuts in coaxial cable of a particular type. Preferably, the first handle member, first upper jaw and second lower jaw are integrally formed as a single piece and the second handle member is integrally formed with the second upper jaw and first lower jaw. A pair of pivot stubs on the second handle member engage corresponding pivot holes in the first handle member so that the handles may be easily snapped together to form a unit.

Also in the preferred design, second and third blade assemblies are stored inside a blade storage compartment that is mounted to swing out from within the second handle member. A bias means such as a coil spring is preferably mounted between the first and second handle members to bias the jaw sets to the closed position

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 3 is a right side elevational view of a coaxial cable trimmer according to the present invention showing the jaws of the tool in the open position.

FIG. 4 is a front elevational view of the open first jaw set seen from the direction 4—4 shown in FIG. 3.

FIG. 5 is a cross-sectional view of the first upper jaw and the blade assembly taken along the lint 5—5 in FIG. 4.

FIG. 5A is a cross-sectional view of the first upper jaw and the blade assembly taken along the line 5A—5A in FIG. 5.

FIG. 6 is a cross-sectional view of the first upper jaw and blade assembly along substantially the same line as in FIG. 4 except illustrating the blade assembly prior to insertion into the first jaw set.

FIG. 7 is a cross-sectional view along the line 7—7 in FIG. 6 showing the first upper jaw and the dovetail engagement track with the blade assembly.

DESCRIPTION OF THE PREFERRED EMBODIMENT

In describing the preferred embodiment of the present invention, reference will be made herein to FIGS. 1-9 of the drawings in which like numerals refer to like features of the invention.

Figure 1:
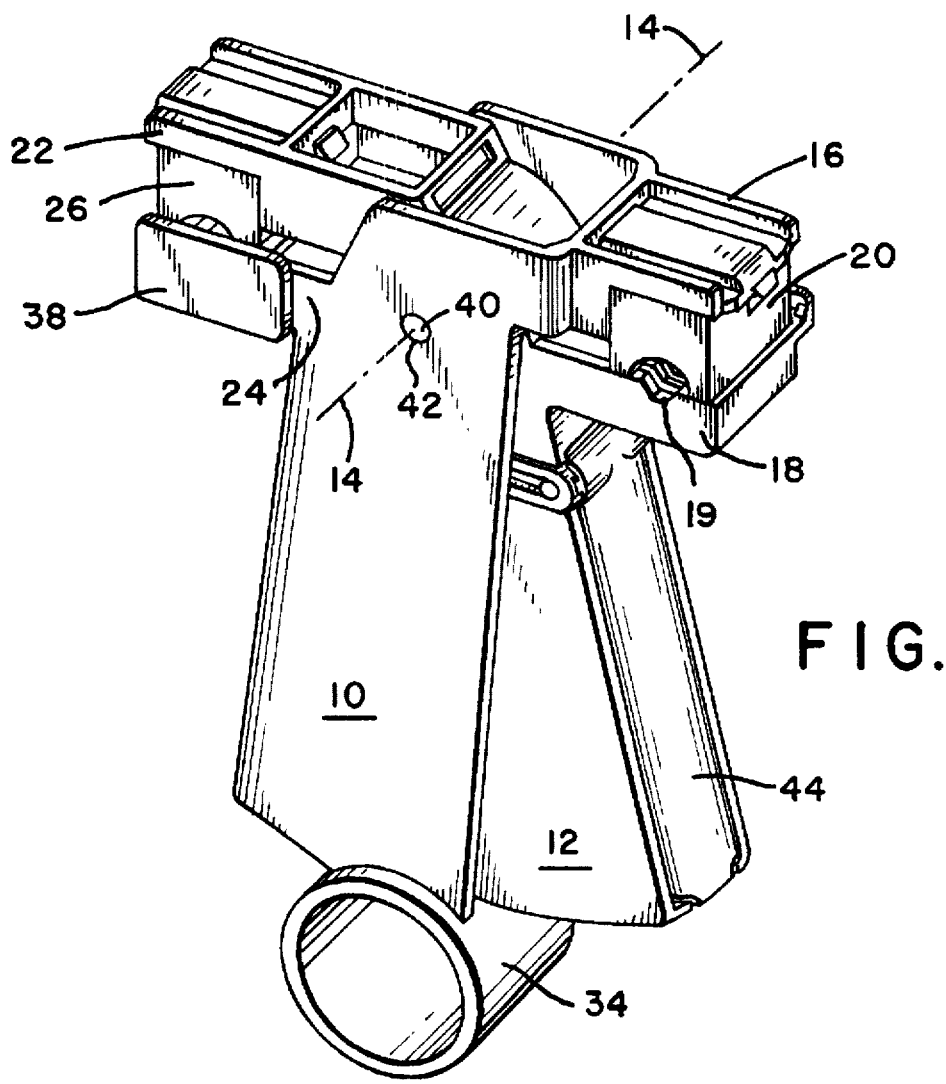
FIG. 1 is a perspective view of the present invention.

Referring to the drawings, and in particular to FIG. 1, the preferred embodiment of the invention comprises a first handle member 10 pivotally connected to a second handle member 12 along a pivot axis 14.

The first handle member 10 includes a first upper jaw 16. A first lower jaw 1B is connected to the second handle member 12. The first upper jaw 16 and the first lower jaw 18 form a first jaw set which opens and closes as the handles are pivoted about pivot axis 14. A first blade assembly 20 is mounted in the first jaw set to make insulation removing cuts on a first type of coaxial cable.

Figure 9:
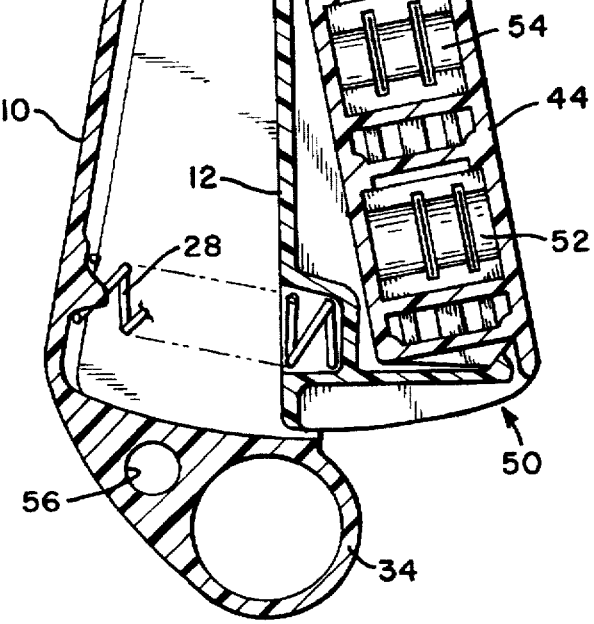
FIG. 9 is a cross sectional view taken through the midplane of the tool in a direction perpendicular to the pivot axis of the handles illustrating the tool with the jaws in the closed position.

On the opposite side of the pivot axis 14 is a second jaw set which includes a second upper jaw 22 and a second lower jaw 24 (see FIG. 9). A second blade assembly 26 is mounted in the second jaw set. The upper jaws of the first and second jaw sets are preferably substantially identical so that each may connect to its corresponding blade assembly in the same way. However, different types of blade assemblies to accommodate different types of coaxial cables are usually inserted in the jaw sets to accommodate different types of cable.

To facilitate the cutting of different sizes of cable, the lower jaws of the two jaw sets are preferably provided with different sized V-shaped notches, 19 and 21. The smaller V-shaped notch 19 provides better positioning for cable having a smaller diameter, and the larger V-shaped notch 21 is better suited for larger cables.

The V-shaped notches are formed by a plurality of parallel plates 23 (see FIG. 4), each of which has a correspondingly aligned V-shaped notch. This gives the inner surfaces of the V-shaped notches which contact the cable a slotted profile instead of a smooth surface. The purpose of these multiple plates and the slotted profile is to reduce the contact area and corresponding friction between the V-shaped positioning notches 19, 21 and the coaxial cable. This reduction in friction permits the tool and cable to be more easily rotated relative to each other as required during the cutting operation.

As will be seen from an examination of FIGS. 1, 3 and 9, the handles 10 and 12 are biased into the closed position by a biasing means such as coil spring 28. This holds the first and second jaw sets in the closed position as illustrated in FIGS. 1 and 9. Other spring-like methods of biasing the handles to this position are also suitable.

When handles 10 and 12 are gripped, the biasing means is compressed and the second handle 12 pivots inside the first handle 10 around pivot axis 14. This opens the first and second jaw sets (as seen in FIG. 3) to allow the insertion of a coaxial cable between the lower jaw and the blade assembly. When the handles are released, the blade assembly and the blades therein are forced against the coaxial cable.

The tool may be held with the thumb resting principally against the second handle member 12 and the remaining fingers pressing against the first handle member 10. In this position the first jaw set is closest to the user's eyes and is in the best position for use. Alternatively, the tool may be reversed to place the thumb near the first handle member 10 and the remaining fingers principally against the second handle member 12. In this reversed position the second jaw set projects towards the user and is in the most convenient position for use. In this way, either the first jaw set or the second jaw set may be most easily used to receive the corresponding type of coaxial cable.

The first blade assembly 20 is designed for use with a particular type of cable and/or a particular type of coaxial cable connector. Referring to FIG. 4, blade assembly 20 cooperates with a first stop 30 used to position the end of a cable 32 (shown in phantom in FIG. 3) at the proper location relative to the blades in the first blade assembly 20. The second blade assembly 22 is preferably designed for a different type of coaxial cable and connector combination. Because the two jaw sets are operated by a single handle pair, two different types of cables may be prepared as seen in FIGS. 2A and 2B without any necessity to adjust the trimmer tool.

Figure 2A:
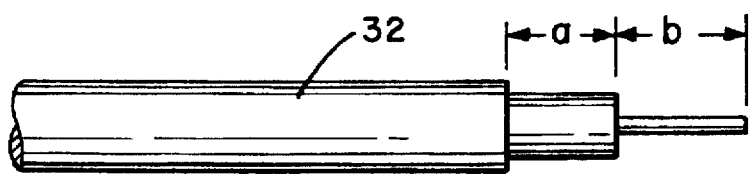
FIGS. 2A and 2B are side elevational views of two different types of coaxial cable illustrating the cuts to be made when preparing the cable for a coaxial connector.
Figure 2B:
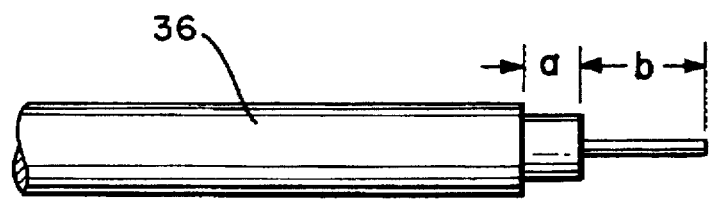

Cable 32 is shown in position prior to being cut in FIG. 4 and after having the insulation removed in FIG. 2A. The insulation cuts are made at the locations indicated by "a" and "b" in FIG. 2A by blades 74 and 76 (see FIG. 5A). The stop 30 positions the end of the cable at the precise location relative to the blades 74, 76 in the first blade assembly 20 so that when the handles 10, 12 are released, the blades 74, 76 in the blade assembly 20 enter the cable to make cuts at the indicated locations.

When the handles are released, the bias means 28 provides sufficient force to initiate the two cuts. The cable is then held with one hand (usually the left) so that it does not turn and the tool is rotated one or more times around the circumference of the cable to make the insulation removing cuts. To assist in making the cuts and rotating the trimmer tool, a finger tube 34 is provided mounted to the bottom of the first handle member 10. The index finger may be conveniently inserted into the finger tube 34 to allow the tool to be rotated around the circumference of the cable.

As can be seen best in FIG. 5A, the blade 74 extends less far than the blade 76. Blade 74 is set to a predetermined depth for its corresponding type of cable to cut through the outer insulation layer, without injuring the outer braid conductor. Blade 76 is set to a deeper predetermined depth for its corresponding type of cable to cut through the outer insulation layer, the outer conductor and the inner insulation layer, without injuring the inner conductor of the coaxial cable.

After the cuts are made around the entire perimeter of the cable, the cable can be withdrawn without opening the jaws to pull the scrap insulation off the end of the cable. The jaws are then opened to allow the scraps to fall from the tool. The back of each jaw set is provided with a barrier to prevent the scraps from entering the tool and interfering with subsequent operation. The barrier for the first jaw set is provided by shelf 27 acting in cooperation with piece 29. The barrier for the second jaw set is provided by wall 31.

FIG. 2B illustrates a second type of coaxial cable 36, with the scrap insulation removed, having different locations for the cuts to correspond to a second type of coaxial connector. These distances are set by the location of the blades in the second blade assembly 26 relative to the second stop 38.

As described above, the two handles are pivotally connected so that they open the two jaw sets when squeezed together. Although various types of pivotal connections for the handles are suitable, in the preferred embodiment the pivotal connection is provided by a pair of pivot stubs 40 projecting outward from opposed sides of the second handle member 12 and into corresponding pivot holes 42 located in the first handle member 10.

Figure 8:
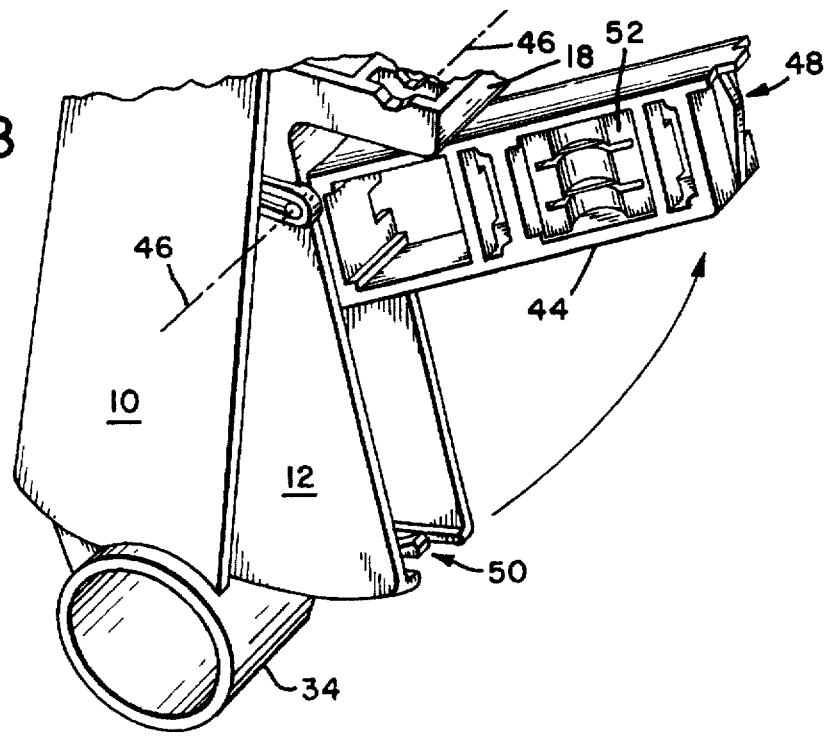
FIG. 8 is a partial perspective view of the first and second handles of the present invention illustrating the blade storage compartment.

In the most highly preferred design, the first handle member 10 is constructed of a pair of opposed side pieces having the pivot holes 42 formed therein. The opposed side pieces of the first handle member are integrally formed with the first upper jaw 16, the second lower jaw 24 and the finger tube 34. The second handle member 12 includes two additional side pieces, set with a narrower width than the two side pieces of the first handle member, to swing within the first handle member as seen in FIGS. 3 and 8. The two additional side pieces of the second handle member have the pivot stubs 40 integrally formed thereon and are integrally connected to the first lower jaw 18 and the second upper jaw 22.

The integral handle assemblies may be constructed at low cost, preferably by injection molding of the like, and are quickly and easily assembled by simply snapping the components together to engage the pivot stubs 40 in the pivot holes 42. Snap-in dovetail connections, to be described more fully below, allow the first and second blade assemblies 20, 22 to be snapped firmly into position in their respective upper jaws.

Although the two blade assemblies provide for the majority of different types of coaxial cable and connectors to be encountered by an installer, it may occasionally be necessary to make cuts for a third and/or even a fourth type of coaxial cable. Accordingly, the present invention provides a blade storage compartment 44 mounted to swing between the second pair of spaced apart side pieces in the second handle member 12.

The blade storage compartment 44 swings about a second pivot axis 46 and snaps into a closed position as illustrated in FIG. 8 via a snap connection between the bottom 48 of the blade storage compartment 44, and an engaging portion 50 at the bottom of the second handle member 12. The blade storage compartment 44 provides storage for a third blade assembly 52 and a fourth blade assembly 54 (see FIG. 9).

The exterior surfaces of the blade assemblies cooperate with the inner surfaces of the blade storage compartment so that they are held into their respective storage areas by friction and will not fall out when the blade storage compartment is opened.

As may be seen in FIGS. 3 and 9, an opening 56 is provided adjacent to the finger tube 34 for a carrying strap hook or other connection to the tool, if desired.

FIGS. 5, 6 and 7 illustrate the dovetail connection 62 and snap-in connection 64 which firmly attach the blade assembly 20 to its corresponding jaw set. Although in the preferred embodiment, the blade assembly is mounted to the upper jaw, the connection may also be reversed to mount the blade assembly to the lower jaw.

As illustrated in FIGS. 5, 6 and 7, the blade assembly 20 slides into a dovetail connection 62 in the upper jaw 16 until resilient hook 64 engages lip 66. Two identical parallel tabs 70 are engaged in a corresponding opening 72. These multiple engagements and connections hold the blade assembly accurately in position relative to the stop 30 and the V-notches to precisely make the desired cuts at the required locations.

The end of the resilient hook 64 on each blade assembly is accessible from the top of the tool so that it may be easily disengaged whenever it is desired to remove a blade assembly. The opening at the top of the tool providing access to the end of the resilient hook is sufficiently large to permit the user's finger to enter and be used to release the blade assembly.

FIG. 5 illustrates the blade assembly 20 in the fully inserted position. Similar connections are made in the second jaw set by the second blade assembly 26. Third and fourth blade assemblies in the blade storage compartment 44 may be used to replace blade assemblies 20, 22 to accommodate different types of coaxial cable. Alternatively, these storage locations may be used to store identical blade assemblies that remain sharp and ready for use whenever the blade assemblies 20, 22 become dull and need replacement.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A coaxial cable trimmer comprising:

a first handle member integrally including a first pair of spaced apart side pieces having a pair of pivot holes formed therein, a first upper jaw and a second lower jaw opposite the first upper jaw;

a second handle member integrally including a second pair of spaced apart side pieces, a pair of pivot stubs projecting outward from the second pair of spaced apart side pieces into the pivot holes formed in the first pair of spaced apart side pieces, a second upper jaw and a first lower jaw opposite the second upper jaw;

the pivot stubs and pivot holes forming a pivotal connection between the first handle member and the second handle member, to position the first upper jaw in operative alignment with the first lower jaw to form a first jaw set and to position the second upper jaw in operative alignment with the second lower jaw to form a second jaw set, the pivotal connection allowing the first and second jaw sets to open and close;

a first blade assembly mounted in the first jaw set;

a second blade assembly mounted in the second jaw set;

a blade storage compartment mounted to swing between the second pair of spaced apart side pieces in the second handle member, the blade storage compartment including at least one blade assembly holding area for holding a third blade assembly; and a bias means mounted between the first and second handle members for biasing the jaw sets closed.

2. A coaxial cable trimmer according to claim 1 wherein the first blade assembly snaps into the first upper jaw and is secured therein without separate fasteners.

3. A coaxial cable trimmer according to claim 2 wherein the first blade assembly snaps into the first upper jaw with a dovetail-shaped connection.

4. A coaxial cable trimmer according to claim 1 wherein the first blade assembly is removable from the first jaw set by sliding out of the first jaw set in a direction perpendicular to an axis of the pivotal connection.

5. A coaxial cable trimmer for making insulation removing cuts in coaxial cable of first and second types comprising:

a first handle member including a first upper jaw and a second lower jaw;

a second handle member including a second upper jaw and a first lower jaw;

a pivot, forming a pivotal connection between the first handle member and the second handle member, to position the first upper jaw in operative alignment with the first lower jaw to form a first jaw set and to position the second upper jaw in operative alignment with the second lower jaw to form a second jaw set, the pivotal connection allowing the first and second jaw sets to open and close as the first and second handle members are pivoted about the pivot;

a first blade assembly mounted in the first jaw set and adapted to make an insulation removing cut in coaxial cable of the first type when the first jaw set is closed; and a second blade assembly mounted in the second jaw set and adapted to make an insulation removing cut in coaxial cable of the second type when the second jaw set is closed.

6. A coaxial cable trimmer according to claim 5 wherein the first blade assembly is removable from the first jaw set.

7. A coaxial cable trimmer according to claim 6 wherein the second blade assembly is removable from the second jaw set.

8. A coaxial cable trimmer according to claim 6 wherein the first blade assembly snaps into the first upper jaw and is secured therein without separate fasteners.

9. A coaxial cable trimmer according to claim 8 wherein the first blade assembly snaps into the first upper jaw with a dovetail-shaped connection.

10. A coaxial cable trimmer according to claim 6 wherein the first blade assembly is removable from the first jaw set by sliding out of the first jaw set in a direction perpendicular to an axis of the pivot.

11. A coaxial cable trimmer according to claim 5 further comprising a blade storage compartment mounted to the second handle member, the blade storage compartment including a blade assembly holding area for holding a third blade assembly.

12. A coaxial cable trimmer according to claim 11 wherein the blade storage compartment further includes a second blade assembly holding area for holding a fourth blade assembly.

13. A coaxial cable trimmer according to claim 11 wherein the blade storage compartment is mounted inside the second handle member and swings out of the second handle member about a second pivot.

14. A coaxial cable trimmer according to claim 5 wherein:

the first handle member, the first upper jaw and the second lower jaw are integrally formed as a single piece, the first handle member including a pair of spaced apart side pieces having a pair of pivot holes formed therein; and the second handle member, the second upper jaw, the first lower jaw and the pivot are integrally formed as a single piece, the pivot comprising a pair of pivot stubs projecting outward from the second handle member, and the second handle member being pivoted between the spaced apart side pieces of the first handle member with the pivot stubs projecting into the pivot holes.

15. A coaxial cable trimmer according to claim 5 further comprising a stop mounted in the first jaw set.

16. A coaxial cable trimmer according to claim 5 further comprising a bias means for urging the first jaw set into the closed position.

17. A coaxial cable trimmer according to 16 wherein the bias means is mounted between the first handle member and the second handle member.

18. A coaxial cable trimmer according to 17 wherein the bias means is a coil spring.

19. A coaxial cable trimmer according to claim 5 further comprising a finger tube mounted to the first handle member for rotating the coaxial cable trimmer about coaxial cable.

* * * * *

UNITED STATES PATENT AND TRADEMARK OFFICE
CERTIFICATE OF CORRECTION

PATENT NO. : 5,713,132
DATED : February 3, 1998
INVENTOR(S) : Andrew J. Tarpill

It is certified that error appears in the above-identified patent and that said Letters Patent is hereby corrected as shown below:

Column 3, Line 42: please delete "1B" and insert - - 18 - -.

Signed and Sealed this

Twelfth Day of May, 1998

Attest:

BRUCE LEHMAN

*Attesting Officer*  *Commissioner of Patents and Trademarks*